Figure 1:
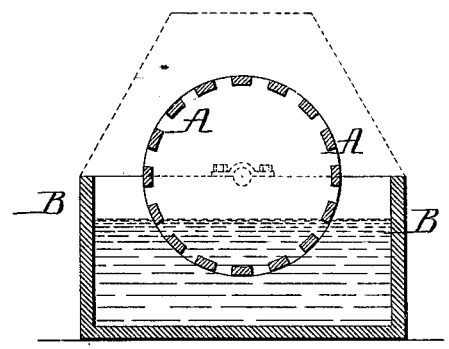
Figure 2:
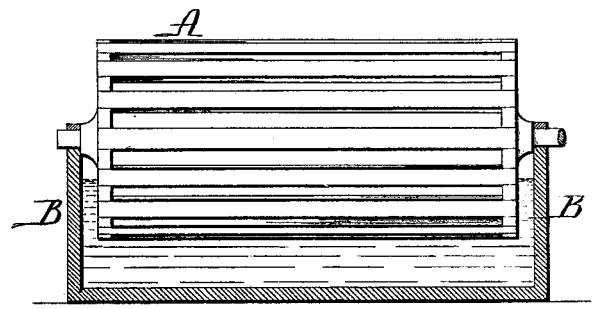

W. ADAMSON.
PROCESS OF TREATING BONES FOR GLUE STOCK.

No. 188,088. Patented March 6, 1877.

Witnesses, Hubert Howson
Harry Smith

William Adamson
by his Atty.
Howson and Son

UNITED STATES PATENT OFFICE.

WILLIAM ADAMSON, OF PHILADELPHIA, PENNSYLVANIA.

IMPROVEMENT IN PROCESSES OF TREATING BONES FOR GLUE STOCK.

Specification forming part of Letters Patent No. 188,088, dated March 6, 1877; application filed September 1, 1874.

*To all whom it may concern:*

Be it known that I, WM. ADAMSON, of Philadelphia, Pennsylvania, have invented an Improvement in Process of Treating Bones for Glue Stock, of which the following is a specification:

The object of my invention is the rapid preparation of bones for glue stock—an object which I attain in the manner described hereafter.

The plan commonly employed of preparing bones for glue stock, &c., so as to deprive them of the calcareous or other earthy matter, and render the extraction of the gelatine more easy, has been to place the bones in tubs, vats, or other vessels containing the dilute acid (phosphoric, muriatic, or other suitable acid) and simply allow the said bones to remain until dissolved. This process is a tedious one, because the calcareous and other earthy matters extracted from the higher bones of the mass by the acid, is precipitated onto the lower bones, and remaining stationary on the same, interferes with the rapid and thorough action of the said acid.

In some instances attempts have been made to facilitate the action of the acid on the bones by revolving them with the acid in a closed vessel, or by stirring the bones in a vessel containing the acid. There is an objection to both these processes, for the earthy or calcareous matters removed from the bones being still in the same vessel with the latter, interferes considerably with the action of the acid. I obviate this objection by removing the earthy or calcareous matters from the vessel containing the bones during the treatment of the latter.

The apparatus by which I prefer to carry out my invention is illustrated in the accompanying drawing, in which—

A is a cage, having a suitable opening through which the bones can be introduced. The cage has journals adapted to bearings on a tank or reservoir, B, containing a supply of dilute acid, in which the cage is caused to revolve, the said cage being only partially immersed in the acid, as shown in the drawing.

As the cage is revolved and the bones thereby maintained in a constant state of agitation, the calcareous or earthy matter extracted passes away from the bones between the bars of the cage, and is deposited on the bottom of the stationary tank B. The precipitate being thus entirely separated from all contact with the bones, the effect of the acid on the latter is much more rapid and effectual than when the earthy matter is allowed to remain in the same vessel with the bones, and in contact with the latter.

It will be necessary to state that when muriatic acid is used, no precipitation takes place until the acid is surcharged with earthy matter, and then the above-described process becomes available.

I wish it to be understood that I do not desire to claim, broadly, the treatment of bones by agitating or stirring them in dilute acid; but

I claim as my invention—

The within-described process of treating bones—that is to say, by agitating them in dilute acid, and at the same time separating the detached earthy or calcareous matter from all contact with the bones, as set forth.

In testimony whereof I have signed my name to this specification in the presence of two subscribing witnesses.

WILLIAM ADAMSON.

Witnesses:
HARRY SMITH,
HUBERT HOWSON.